Figure 1:
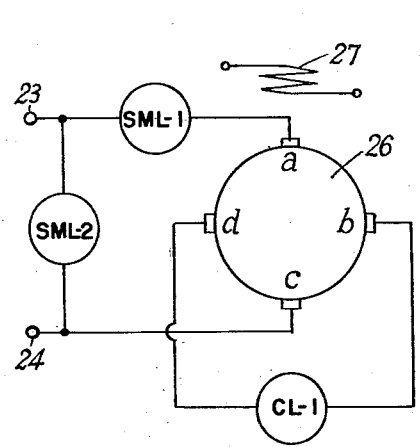

June 18, 1957  J. M. PESTARINI  2,796,570

ELECTRIC POWER SYSTEM

Filed April 21, 1952

INVENTOR.
Joseph M. Pestarini
BY Philip G. Hilbert
ATTORNEY

United States Patent Office 2,796,570
Patented June 18, 1957

2,796,570

ELECTRIC POWER SYSTEM

Joseph M. Pestarini, Staten Island, N. Y.

Application April 21, 1952, Serial No. 283,441

7 Claims. (Cl. 318—140)

This invention relates to electric power systems.

An object of this invention is to provide an electrical system including at least two rotating electric machines and a direct current source interconnected through a transformer metadyne, wherein at any given moment one of the machines functions as a generator while the other machine operates as a motor; the transformer metadyne being operative to automatically proportion the voltage and current requirements of each machine to allow power to move between the machines.

A further object of this invention is to provide a system of the character described wherein various combinations of machines capable of interchangeably operating as generators or motors, are connected between the brushes of a transformer metadyne, whereby interchange of power between the different kinds of machines is automatically effected irrespective of the voltage and current requirements of each machine.

A further object of this invention is to provide electric machines operating at variable speed and adapted to convert electric energy into mechanical energy together with means for controlling such conversion independently of the voltage applied to the machines or independently of the current traversing the machines.

Another object of this invention is to provide a transformer metadyne for controlling the power transfer between the machines of the two groups and further adapted to interchange electric and mechanical energy.

Still another object of this invention is to provide a power system including rotatable electric machines together with means for dissipating electrical energy when the machines reach their maximum safe speed.

The dynamo electric machine, known as the metadyne and hereinafter referred to, has been described in Patents 2,055,240; 1,987,417; 2,038,380; 2,049,389 and 2,079,465. The machine is further described in Revue Generale de l'Electricite of March 8 and 15, August 16 and 23, November 22 and 29, and December 6, 1930, Paris.

Figure 2:
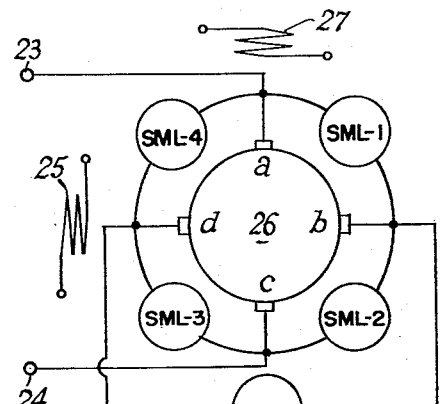
Figure 3:
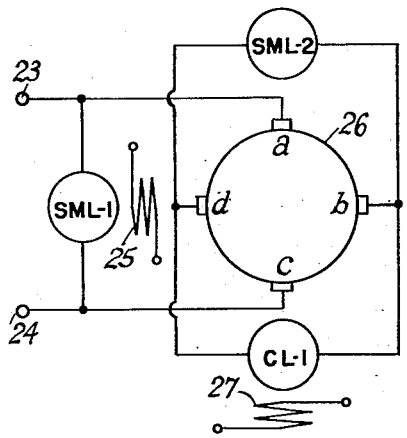
Figure 5:
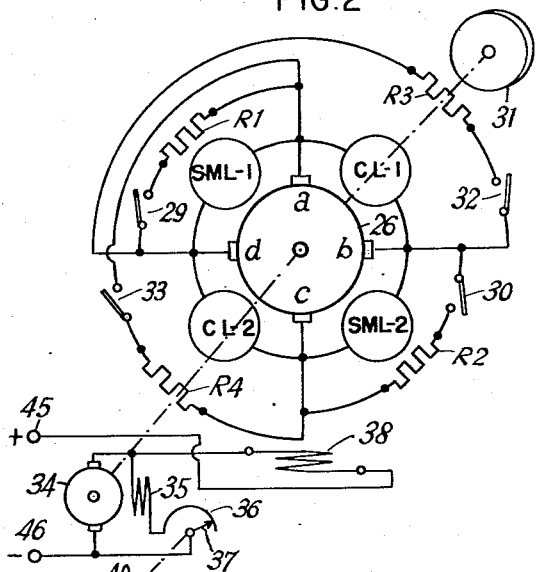
Figure 4:
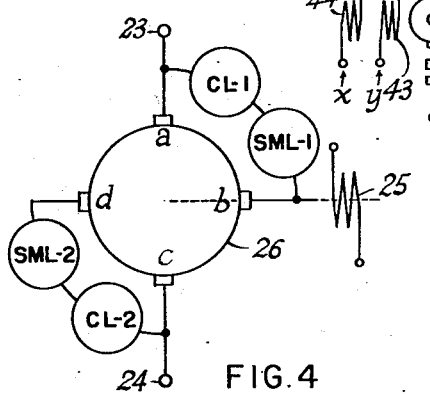

In the drawing;

Fig. 1 shows a power system embodying the invention wherein a motor and variable speed electric machines are interconnected by a transformer metadyne; Fig. 2 and Fig. 3 show modified forms of the system; Fig. 4 shows the interconnection of a pair of motors and variable speed electric machines through a transformer metadyne; and Fig. 5 shows details of connections for the transformer metadyne as well as means for dissipating electric energy when the machines have reached their maximum safe speed.

Referring in detail to the drawing, and particularly to Fig. 1, a transformer metadyne 26 having an armature provided with a pair of primary brushes $a$, $c$ and a pair of secondary brushes $b$, $d$, displaced therefrom, and a pair of control stator windings 25, 27, is arranged for connection to the terminals 23, 24 of a direct current source, the terminals being connected to the primary brushes $a$, $c$.

A variable speed machine SML2 is connected across primary brushes $a$, $c$ and a second variable speed machine SML1 is connected in series with brush $a$. A motor CL1 is connected across secondary brushes $b$, $d$.

The control of the transfer of power between the machines and the direct current source may be effected by varying the voltage applied to the brushes, by varying the current traversing the brushes or by varying the ampere turns of the control stator windings. Thus, the winding 25 with its magnetic axis substantially coincident with the flux created by the currents traversing the armature through the secondary brushes $b$, $d$, and the winding 27 with its magnetic axis substantially coincident with the flux created by the currents traversing the armature through the primary brushes $a$, $c$, may be used to provide controlling means for the transfer of power.

The operational speed of the transformer metadyne 26 may be controlled by means shown in detail in Fig. 5 and hereinafter described. Such control means may be applied to the transformer metadynes shown in the several figures of the drawing.

The flux created by the current of motor CL1 traversing the armature of the metadyne 26 and the resultant flux created by the currents of the direct current source and the variable speed machines SML1 and SML2 also traversing said armature, will form an angle of substantially 90 electrical degrees. The power system will operate satisfactorily if such angle between the fluxes is other than 90 degrees but must be greater than zero.

In one instance, the ampere turns of control winding 25 may be set so as to create a flux which will induce between the primary brushes $a$, $c$, an electromotive force balancing the constant voltage between terminals 23, 24 of the direct current source. Additionally, the ampere turns of control winding 27 may be set so as to create a flux inducing between the secondary brushes $b$, $d$ an electromotive force balancing the voltage of motor CL1. In such case, no current will traverse the metadyne armature and no transfer of energy will occur.

In the operation of the system shown in Fig. 1, if it is desired to have a condition wherein no power is transferred between machine CL1 on the one hand and machines SML1 and SML2 and current source 23, 24 on the other hand, and metadyne 26 is rotating, if the flux created by the ampere turns of winding 25 induces between the primary brushes $a$, $c$, a voltage exactly equal to the voltage at terminals 23, 24, no primary current can traverse the primary brushes $a$, $c$, assuming that the variable speed machine SML1 does not induce an electromotive force. Therefore, only winding 27 will create a flux along the primary commutating axis corresponding to brushes $a$, $c$. Accordingly, the voltage induced between the brushes $b$, $d$ will be exactly equal to the E. M. F. induced in machine CL1 and no current will traverse the secondary brushes $b$, $d$. Thus, both primary and secondary currents are zero and no transfer of power will take place as indicated above.

Assume further, that machine SML1 does induce an E. M. F., the same result can be attained as above described, if winding 25 is made operative to create a flux that induces between brushes $a$, $c$ an E. M. F. equal to the sum of the E. M. F. at terminals 23, 24 and the E. M. F. induced by machine SML1.

If it is desired to change from the condition described above to a condition wherein power is transferred from the group comprising machines SML1, SML2 and current source 23, 24, to machine CL1, winding 27 is made operative to create a flux effective to induce an E. M. F. between brushes $b$, $d$ which is greater than the E. M. F. induced by the machine CL1. In this case, the brushes $b$, $d$ will supply a current to machine CL1 in a direction opposite to that of the E. M. F. created by machine CL1 and therefore makes machine CL1 absorb power from the metadyne 26.

Under these conditions, the flux created by the secondary current traversing the armature of the metadyne 26 will have the effect of altering the balance existing between the E. M. F. induced between brushes $a, c$ and the voltage impressed on said brushes by source 23, 24 and machine SM1, and, therefore a primary current will traverse the brushes $a, c$.

The ampere turns of winding 25 may be modified in a manner as to induce an E. M. F. between brushes $a, c$ which in less than the combined E. M. F.'s of the source 23, 24 and machine SML1, in which case, power will be supplied to the brushes $a, c$ of the metadyne 26 by source 23, 24 and machines SML1, SML2. The amount of power supplied to said brushes $a. c.$ depends on the intensity of the current energizing the winding 25.

By controlling the current intensity in winding 25, for a predetermined current intensity, the primary brushes $a, c$, of the metadyne 26 will absorb the same amount of power as is supplied by the brushes $b, d$ to machine CL1. With energizing currents other than said predetermined intensity, the power applied to brushes $a, c$ is greater or lesser than the power supplied by brushes $b. d$. The difference between the power applied to said brushes $a, c$ and supplied by brushes $b, d$ must be supplied or absorbed by the metadyne 26, casing said metadyne to accelerate or decelerate and therefore transforming mechanical power into electrical power or vice versa.

Similarly, the system may be operated in a manner to cause machine SML1 to supply power to the brushes $b, d$ of metadyne 26, in which case machines SML1, SML2 and current source 23, 24 will receive power from the primary brushes $a, c$, by proper control of the currents energizing windings 25, 27 so as to reverse the action of said windings as described above.

The variable speed machine SML1 and SML2 may take the form of dynamo electric machines of the metadyne type as more completely described in Patent 2,642,556; Patent 2,662,999, or a dynamo with an exciter of the metadyne type as more completely described in application Ser. No. 715,792, filed December 12, 1956, now Patent No. 2,593,483. Such machines may be operated to supply a current equal to the primary current entering the transformer metadyne 26 by its primary brush $a$. In such case, the total power supplied or absorbed by the motor CL1 will be absorbed or supplied by the variable speed machines SML1 and SML2 while the direct current source will neither supply or absorb current.

Machines SML1, SML2 are metadynes having associated flywheels adapted to store mechanical energy and are provided with control windings causing said metadynes either to absorb electric power and accelerate, or to supply electrical power and decelerate, or to maintain their speeds at values which require very small amounts of power to overcome friction losses. Thus, machines SML1, SML2 may supply or absorb the total power that must be applied to or supplied by the brushes $a, c$ of metadyne 26, taken together with suitable energization of windings 25, 27, and, accordingly, in such case, the system will operate with no power derived from or supplied to terminals 23, 24. This is only possible within certain limits in respect to the energy stored in the rotating masses of the machines involved.

Such system is therefore applicable to cases where the operation of machine CL1 varies as to speed, acceleration and deceleration. Thus, the system permits the source 23, 24 to supply power approaching the average power absorbed by machine CL1 and avoiding the need for supplying intermittent surges of power.

If the direct current at terminals 23, 24 is of constant voltage, then the ampere turns of stator winding 27 may control the primary current traversing the brushes $a, c$. If then, the variable speed machine SML1 is caused to induce an electromotive force equal to the complement of the voltage between the primary brushes $a, c$ and if the primary current of the metadyne is made constant, then regardless of the power absorbed by motor CL1, the power supplied by the direct current source at constant voltage, will be constant.

In Fig. 2, the terminals 23, 24 of the direct current source are connected to the primary brushes $a, c$ of transformer metadyne 26 and motor CL1 is connected to the secondary brushes $b, d$, as previously described. Similar, variable speed machines SML1, SML2, SML3 and SML4 are connected between consecutive brushes of the metadyne, respectively. The voltage between the metadyne brushes and its armature current control the power transfer between the machines connected to the brushes.

When the winding 27 creates a flux inducing an electromotive force between the brushes $b, d$ balancing the voltage of the motor CL1 while the winding 25 creates a flux inducing an electromotive force between brushes $a, c$ balancing the voltage between the terminals 23, 24, no current traverses the metadyne armature while power is transferred between the machines.

Here, as in Fig. 1, the energization of windings 25, 27 effects the desired form of system operation.

In Fig. 3, the primary brushes $a, c$ of the transformer metadyne 26 are connected to terminals 23, 24 of a direct current source and to a variable speed machine SML1, as previously described. The secondary brushes $b, d$ are connected to a motor CL1 and to a variable speed machine SML2 which is similar to machine SML1.

The stator windings 25, 27 of the metadyne 26 control the transfer of power as previously described and further, a transfer of power between motor CL1 and machine SML2 is obtained by controlling the current supplied or absorbed by machine SML2. Machine SML1 operates in the manner described in connection with Fig. 1.

As shown in Fig. 4, a pair of similar motors CL1, CL2, together with a pair of similar variable speed machines SML1, SML2 may be interconnected through transformer metadyne 26. Thus, motor CL1 and machine SML1 are series connected between brushes $a, b$ of the metadyne while motor CL2 and machine SML2 are series connected between brushes $c, d$ of the metadyne. Such connections permit the direct transfer of power between each motor and its series connected variable speed machine, by controlling the voltage induced by the variable speed machine.

Means is provided for absorbing electric power when the safe speed of the variable machines is reached, as shown in Fig. 5. Furthermore, the system may operate in the absence of a source of direct current. Thus, motors CL1, CL2 are connected between consecutive pairs of brushes $a, b; c, d$, respectively and variable speed machines SML1, SML2 are connected between consecutive pairs of brushes $a, d; b, c$, respectively. In parallel with machines SML1, SML2 are resistors R1, R2, respectively, the resistors being provided with series connected switches 29, 30, respectively. Additionally, resistors R3 and R4 are connected across brushes $b, d; a, c$, respectively and provided with series connected switches 32, 33, respectively.

When switches 29, 30 are open, transfer of power will take place as between motors CL1, CL2 and machines SML1, SML2. If the maximum safe speed of the machines SML1, SML2 is reached and the motors are still capable of supplying power, the switches 29, 30 are closed and the power will be dissipated in the resistors R1, R2.

The system shown in Fig. 5 may also include a direct current source whose terminals may be connected to brushes $a, c$ of the metadyne 26, as previously described and suitable switches may be provided to connect or disconnect such source with the metadyne.

The transformer metadyne 26 may be adapted for the interchangeable transformation of electric energy into mechanical energy in a manner more completely described in application Ser. No. 712,630, filed November 27, 1946, now patent No. 2,637,013.

Thus, as shown in Fig. 5, the metadyne 26 is coupled to a flywheel 31 and to a regulator dynamo 34 which is shunt excited by field winding 35. The dynamo 34 energizes a control stator winding 38 of the metadyne 26 with a regulator current, the dynamo 34 being further connected to the terminals 45, 46 of a constant voltage source. The metadyne 26 includes a control stator winding, not shown, entirely similar to control winding 25 shown in Figs. 1–3, and having the same function. The resistance of the field winding 35 may be varied by means of a variable resistance 36 whose movable contact 37 is operated by a governor dynamo 39. The dynamo 39 is energized through terminals 40, 42 of a direct current source, a ballast resistor 41 being provided for limiting the armature current when the governor dynamo is at a standstill. The dynamo 39 further includes control windings 43, 44 which are adapted to be traversed by currents $y$, $x$ respectively for the purpose of controlling the orientation, torque developed and speed of the governor dynamo, as more completely described in said Patent 2,637,013.

In the system shown in Fig. 5, the control winding 38 which corresponds to winding 27 of Fig. 1, is energized in an automatic manner through the operation of the regulator dynamo 34 which is responsive to the rotational speed of the metadyne 26 and thus automatically controls the distribution of power between the several types of machines interconnected to said metadyne, while a second winding, not shown, and corresponding to winding 25 of Fig. 1, is energized in the manner previously described.

While in Fig. 5, the transformer metadyne 26 is shown as capable of interchangeably transforming electric energy into kinetic energy, it is understood that as shown in the previous figures, the metadyne may additionally and simultaneously control the transfer of power in the system.

This application is a continuation-in-part of application Ser. No. 715,792, filed December 12, 1946, now Patent No. 2,593,483.

It is understood that the embodiments of the invention shown and described are to be interpreted as illustrative and not limiting except as set forth in the claims following.

Having thus described my invention, I claim as new and desire to protect by Letters Patent:

1. An electric power system comprising a source of electric current, a transformer metadyne having an armature with a set of primary brushes and a set of secondary brushes associated therewith, and a plurality of control stator windings, and a plurality of electric machines operative to interchangeably transform electric energy into mechanical energy, said source of electric energy being connected to said primary brushes, each of said machines being connected to a different combination of paired brushes, said control stator windings being operative upon regulated energization thereof whereby the flux created by the current of one of said machines traversing the armature of the metadyne and the flux created by the source of current and another of said machines traversing the armature of the metadyne form an angle of substantially 90 electrical degrees.

2. A power system as in claim 1 wherein one of said stator windings has its magnetic axis coincident with the commutating axis of said primary brushes and another of said stator windings has its magnetic axis coincident with the commutating axis of said secondary brushes.

3. A power system as in claim 1, wherein one of said machines is of variable speed and is connected to said primary brushes and another of said machines is a motor connected to said secondary brushes.

4. A power system as in claim 1 wherein at least one of said machines is a variable speed machine connected between a pair of consecutive brushes and another of said machines is a motor connected to said secondary brushes.

5. A power system as in claim 1, wherein one of said machines is a motor connected to said secondary brushes, another of said machines is a variable speed machine connected to said secondary brushes and a third of said machines is a variable speed machine connected to said primary brushes.

6. A power system as in claim 1 wherein a pair of said machines are series connected between a pair of consecutive brushes of said tranformer metadyne, one of said machines being a motor and another of said machines being a variable speed machine.

7. An electric power system comprising a current source, a transformer metadyne having an armature with a set of primary brushes and a set of secondary brushes associated therwith, a control stator winding having its magnetic axis coincident with the commutating axis of said primary brushes, a second control stator winding having its magnetic axis coincident with the commutating axis of said secondary brushes, a rotating electric machine in circuit with a selected pair of said brushes, and a variable speed electric machine in circuit with a selected pair of said brushes, circuit means connecting said current source with said primary brushes, a regulator dynamo for regulated the speed of said metadyne, circuit means connecting the output of said regulator dynamo with said first mentioned control winding, said second control winding being adapted to be energized by currents of intensity values operative to permit the supply of power to said primary brushes by said current source and said variable speed machine to be varied in relation to the power output of said metadyne at the secondary brushes thereof, the difference between the power supplied to the primary brushes and the power output of the secondary brushes being supplied or absorbed by said metadyne through acceleration or deceleration respectively of said metadyne.

References Cited in the file of this patent

UNITED STATES PATENTS

| | | |
|---|---|---|
| 2,049,389 | Pestarini | July 28, 1936 |
| 2,072,768 | Pastarini | Mar. 2, 1937 |
| 2,593,483 | Pestarini | Apr. 22, 1952 |